(12) United States Patent
Feng

(10) Patent No.: US 12,010,252 B1
(45) Date of Patent: Jun. 11, 2024

(54) FOLDABLE PHONE CASE

(71) Applicant: Shenzhen Yinhao Technology Co., Ltd., Shenzhen (CN)

(72) Inventor: Mou Feng, Yangjiang (CN)

(73) Assignee: Shenzhen Yinhao Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/518,574

(22) Filed: Nov. 23, 2023

(51) Int. Cl.
*H04M 1/02* (2006.01)
*G06F 1/16* (2006.01)

(52) U.S. Cl.
CPC ........ *H04M 1/0235* (2013.01); *G06F 1/1628* (2013.01); *H04M 1/0216* (2013.01)

(58) Field of Classification Search
CPC .............................. H04M 1/216; G06F 1/1628
See application file for complete search history.

(56) References Cited

U.S. PATENT DOCUMENTS

| | | | | |
|---|---|---|---|---|
| 5,200,913 A * | 4/1993 | Hawkins | ............... | G06F 1/1679 345/169 |
| 6,239,968 B1 * | 5/2001 | Kim | ...................... | G06F 1/1626 361/755 |
| 7,508,383 B2 * | 3/2009 | Lev | ....................... | G06F 1/1613 345/184 |
| 8,248,390 B2 * | 8/2012 | Sheynkman | .......... | G06F 1/1626 345/173 |
| 8,462,140 B2 * | 6/2013 | Hsu | ......................... | H05K 5/00 345/179 |
| 8,493,369 B2 * | 7/2013 | Liang | ..................... | B43K 24/10 345/179 |
| 9,124,681 B2 * | 9/2015 | Park | ........................ | H04M 1/21 |
| 9,735,827 B2 * | 8/2017 | Richardson | ............ | G06F 1/1656 |
| 9,880,589 B2 * | 1/2018 | Noguchi | ............. | G06F 3/03545 |
| 10,664,012 B1 * | 5/2020 | Zimmerman | .......... | G06F 1/1632 |
| 10,802,612 B2 * | 10/2020 | de la Fuente | ......... | H02J 7/0045 |
| 11,632,141 B1 * | 4/2023 | Weng | ................... | H04B 1/3888 455/575.8 |
| 11,870,481 B1 * | 1/2024 | Huang | ................. | H04B 1/3888 |
| 2006/0278234 A1 * | 12/2006 | Maatta | .................. | G06F 1/1686 128/206.19 |
| 2013/0206614 A1 * | 8/2013 | O'Neill | .................... | B23P 19/04 29/428 |
| 2014/0152576 A1 * | 6/2014 | Kim | ...................... | G06F 3/0412 345/169 |
| 2014/0255899 A1 * | 9/2014 | Poullain | ................... | G09B 9/08 434/351 |

(Continued)

FOREIGN PATENT DOCUMENTS

| | | |
|---|---|---|
| CN | 210469460 U | 5/2020 |
| CN | 215420375 U | 1/2022 |
| CN | 218341858 U | 1/2023 |

*Primary Examiner* — Lewis G West
(74) *Attorney, Agent, or Firm* — Nitin Kaushik

(57) ABSTRACT

The present disclosure relates to a foldable phone case, including a front protective case, a rear protective case, and a stylus pen holder. An accommodating cavity suitable for accommodating a stylus pen is provided in the stylus pen holder. The stylus pen is arranged in a pen sleeve. The pen sleeve is arranged in the accommodating cavity. By arranging the pen sleeve, the stylus pen holder can adapt to different sizes of stylus pens. By arranging an alignment structure at a bottom of the pen sleeve, the stylus pen will be aligned automatically when inserted.

12 Claims, 13 Drawing Sheets

(56) References Cited

U.S. PATENT DOCUMENTS

| | | | | |
|---|---|---|---|---|
| 2017/0156465 A1* | 6/2017 | Zaloom | ............... | G06F 1/1669 |
| 2017/0222456 A1* | 8/2017 | Perez | ................... | G06F 1/1681 |
| 2018/0062686 A1* | 3/2018 | Lucente | ............... | A45C 13/02 |
| 2019/0260411 A1* | 8/2019 | Langhans | ............... | H04M 1/21 |
| 2020/0174530 A1* | 6/2020 | Wu | ..................... | G06F 1/1686 |
| 2022/0224372 A1* | 7/2022 | Altaras | ............... | H04M 1/185 |
| 2023/0046166 A1* | 2/2023 | Hwang | .............. | H04M 1/0216 |
| 2023/0081984 A1* | 3/2023 | Lee | ..................... | H05K 5/0226 |
| | | | | 361/807 |

\* cited by examiner

FOLDABLE PHONE CASE

TECHNICAL FIELD

The present disclosure relates to the technical field of phone accessories, and in particular to a foldable phone protective case.

BACKGROUND

With the technological development of smartphones, there are more and more choices of display sizes for smartphones. As a result, smartphones are bulky and inconvenient to carry. Foldable phones are popular among consumers as an emerging product. A phone with a foldable screen includes an upper folding screen and a lower folding screen which are hinged. The upper folding screen has a first screen, and the lower folding screen has a second screen. When the phone in use, the upper folding screen and the lower folding screen can be opened, for example, by 180 degrees. At this time, the first screen and the second screen are combined to form the screen of the phone. When the phone is not in use, the user may rotate the upper folding screen and the lower folding screen such that the upper folding screen overlaps the lower folding screen. This can effectively reduce the volume of the phone and make the phone convenient to carry.

The foldable phone cases in the prior art do not have the function of accommodating the stylus pen, or cannot accommodate different sizes of stylus pens, which is not convenient for users to use.

SUMMARY

The present disclosure provides a foldable phone case, which solves the technical problem that the foldable phone cases in the prior art cannot accommodate different sizes of stylus pens, which is not convenient for users to use.

The solution of the present disclosure to solve the above technical problem is as follows: provided is a foldable phone case. A foldable phone includes an upper folding portion with a first screen and a lower folding portion with a second screen, and the upper folding portion and the lower folding portion are connected through a hinge. The foldable phone case includes: a front protective case, configured to accommodate the upper folding portion of the foldable phone; a rear protective case, configured to accommodate the lower folding portion of the foldable phone; and a stylus pen holder, including a first side surface and a second side surface parallel to each other. The front protective case is detachably connected with the first side surface, the rear protective case is rotatably connected with the second side surface, and the stylus pen holder is rotatably openable and closable relative to the rear protective case. An accommodating cavity suitable for accommodating a stylus pen is provided in the stylus pen holder. The stylus pen is arranged in a pen sleeve. The pen sleeve is arranged in the accommodating cavity. A bottom end of the pen sleeve is provided with an automatic alignment structure. A top of the stylus pen holder is provided with an insertion hole, and the insertion hole communicates with the accommodating cavity.

Preferably, the automatic alignment structure includes a guide groove provided at a bottom of the pen sleeve, and the guide groove extends respectively from two sides to the bottom end of the pen sleeve to form arc surfaces. The arc surfaces on the two sides intersect at the bottom end of the pen sleeve, and an opening formed by the arc surfaces on the two sides gradually expand from top to bottom. A bottom end of the accommodating cavity is provided with a guide strip, and the guide strip is insertable into the guide groove along the arc surfaces on the two sides.

Preferably, a first mounting cylinder and a second mounting cylinder are arranged in the accommodating cavity. An outer side of the second mounting cylinder is provided with an avoidance hole, and a side wall of the accommodating cavity is provided with elastic protrusions.

Preferably, one side of the rear protective case adjacent to the second side surface is provided with a hinge groove, and the second side surface of the stylus pen holder is provided with a hinge protrusion. The hinge protrusion is arranged in the hinge groove, and a pin is arranged in the hinge protrusion and the hinge groove. A torsion spring is arranged in a gap between the hinge protrusion and the hinge groove. One end of the torsion spring is fixedly connected with the hinge groove, and the other end is fixedly connected with the hinge protrusion. The torsion spring is sleeved on a periphery of the pin.

Preferably, a side edge of the rear protective case is provided with a button portion, a bottom of the rear protective case is provided with a data line jack, and a rear surface of the rear protective case is provided with a sound transmission hole and a camera hole; and there are a plurality of sound transmission holes provided.

Preferably, a rear surface of the rear protective case is rotatably connected with a bracket, and the bracket is openable or closable relative to the rear protective case.

Preferably, the rear surface of the rear protective case is further provided with a bracket groove, the bracket is accommodatable in the bracket groove when closed, and a length direction of the bracket groove is parallel to a length direction of the rear protective case.

Preferably, the bracket includes a rotating bracket and a sliding bracket. The rotating bracket is rotatably connected with the sliding bracket. The rotating bracket is rotatably connected with an upper part of the bracket groove, and the sliding bracket is slidably connected with a lower part of the bracket groove.

Preferably, two sides of the lower part of the bracket groove are provided with sliding grooves.

One end of the rotating bracket is provided with a first hinge pin, and a middle part of the rotating bracket is provided with a first hinge hole. One end of the sliding bracket is provided with a second hinge pin, and the other end is provided with a third sliding pin. The first hinge pin is inserted into the upper part of the bracket groove and rotatably connected with the bracket groove. The first hinge hole is rotatably connected with the second hinge pin. The third sliding pin is inserted into the sliding groove and slidably connected with the sliding groove.

Preferably, one side of the pen sleeve is provided with a semicircular groove, and the stylus pen is arranged in the semicircular groove.

Preferably, two opposite sides of the side wall of the accommodating cavity are provided with the elastic protrusions for elastically clamping the pen sleeve in the accommodating cavity.

Preferably, magnetic members capable of attracting each other are respectively embedded in the second side surface of the stylus pen holder and opposite side walls of the front protective case in corresponding positions.

The present disclosure has the following beneficial effects: the foldable phone case provided by the present disclosure has the following advantages:

1. One side of the rear protective case is rotatably connected with the stylus pen holder. The stylus pen holder can be folded or unfolded, and when the stylus pen holder is folded, the hinge of the phone can be covered to better protect the hinge of the foldable phone, thereby preventing the hinge from being damaged when the foldable phone falls, and effectively prolonging the service life of the foldable phone.

2. The stylus pen holder can accommodate different sizes of stylus pens. A large-sized stylus pen can be directly inserted into the stylus pen holder. A small-sized stylus pen can be inserted into the pen sleeve, and then the pen sleeve is inserted into the stylus pen holder. By arranging the pen sleeve, the stylus pen holder can adapt to different sizes of stylus pens, so as to widen an application range of the stylus pen holder.

3. The bottom end of the pen sleeve is provided with the automatic alignment structure, so that the pen sleeve can be aligned automatically after inserted into the stylus pen holder. One side of the semicircular groove is aligned with the avoidance hole, so that the stylus pen can be taken out conveniently. The automatic alignment structure includes the guide groove provided with at the bottom of the pen sleeve, and the guide groove extends respectively from the two sides to the bottom end of the pen sleeve to form the arc surfaces. The guide strip in the accommodating cavity comes into contact with the arc surfaces first. As the further insertion of the pen sleeve, the guide strip is in contact with the arc surfaces all the time and finally inserted into the guide groove. During this process, the pen sleeve rotates to be aligned under the action of the guide strip. By arranging the alignment structure, the pen can be inserted without a need for distinguishing between a front side and a back side. As long as a penpoint is faced down, the stylus pen will be aligned automatically when inserted.

The above description is only a general description of the technical solution of the present disclosure. In order to understand the technical means of the present disclosure more clearly such that they can be implemented in accordance with the content of the specification, a detailed description will be given below with reference to preferred examples of the present disclosure in conjunction with the accompanying drawings. Specific embodiments of the present disclosure are given in detail by the following examples and the accompanying drawings thereof.

BRIEF DESCRIPTION OF DRAWINGS

The accompanying drawings described herein are intended to provide a further understanding of the present disclosure and constitute a part of the present disclosure, and exemplary examples and descriptions of the present disclosure are used to explain the present disclosure and do not constitute an improper limitation to the present disclosure. In the accompanying drawings.

Figure 1:
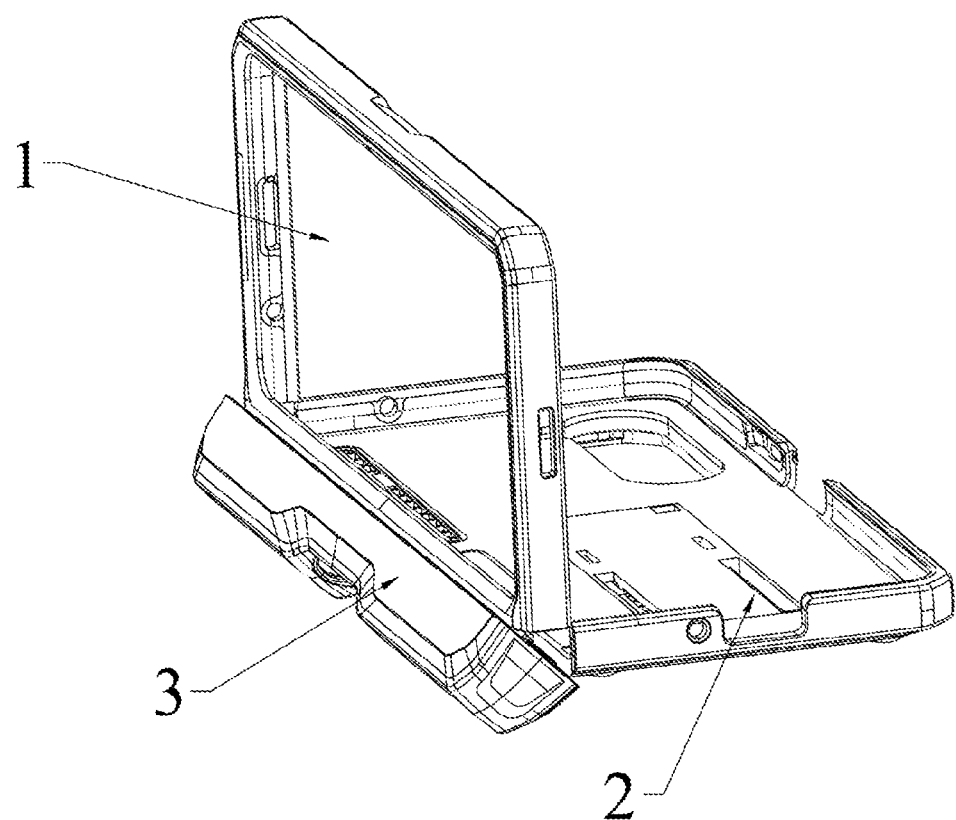
FIG. 1 is a schematic three-dimensional structural view of a foldable phone case, in which a front protective case and a rear protective case form a 90° angle.

In the accompanying drawings, the components represented by reference symbols are as follows:

1, front protective case; 11, hollow window;
2. rear protective case; 21, button portion; 22, sound transmission hole; 23, data line jack; 24, camera hole; 25, hinge groove; 26, bracket groove; 261, sliding groove;
3, stylus pen holder; 31, first side surface; 32, second side surface; 33, accommodating cavity; 331, first mounting cylinder; 332, second mounting cylinder; 333, avoidance hole; 34, insertion hole; 35, elastic protrusion; 36, guide strip; 37, hinge protrusion; 38, pin; 39, torsion spring;
4, pen sleeve; 41, semicircular groove; 42, arc surface; 43, guide groove;
5, stylus pen;
6, bracket; 61, rotating bracket; 611, first hinge pin; 612, first hinge hole; 62, sliding bracket; 621, second hinge pin; 622, third hinge pin.

DETAILED DESCRIPTION OF THE EMBODIMENTS

The principles and features of the present disclosure are described below with reference to FIG. 1 to FIG. 11, and the examples given are intended only to explain the present disclosure, not to limit the scope of the present disclosure. The present disclosure will be described more specifically by way of examples in the following paragraphs with reference to the accompanying drawings. The advantage and features of the present disclosure will become more apparent from the following description and claims. It should be noted that the accompanying drawings are in a very simplified form and are used in a non-precise scale, and are used only for the purpose of conveniently and clearly assisting in the illustration of examples of the present disclosure.

It should be noted that when a component is referred to as being "fixed to" another component, it may be directly on the another component or there may be an intermediate component. When a component is referred to as being "connected to" another component, it may be directly connected to the another component or an intermediate component may be present at the same time. When a component is referred to as being "arranged on" another component, it may be directly arranged on the another component or an intermediate component may be present at the same time. The terms "vertical", "horizontal", "left" and "right" and similar expressions used herein are for illustration purposes only.

Unless otherwise defined, all technical and scientific terms used herein have the same meaning as commonly understood by those skilled in the art of the present disclosure. The terms used in the specification of the present disclosure are only for the purpose of describing specific examples and are not intended to limit the present disclosure. The term "and/or" used herein includes any and all combinations of one or more related listed items.

Referring to FIG. 1 to FIG. 4, a foldable phone protective case provided by an example of the present disclosure will be described. A common foldable phone includes an upper folding portion with a first screen and a lower folding portion (not shown) with a second screen. The foldable phone protective case is used for protecting the foldable phone. The foldable phone protective case includes a front protective case 1, a rear protective case 2 and a stylus pen holder 3. The front protective case 1, the rear protective case 2 and the stylus pen holder 3 may be injection molded parts. The front protective case 1 is configured to accommodate the upper folding portion of the foldable phone. The rear protective case 2 is configured to accommodate the lower folding portion of the foldable phone. The stylus pen holder 3 is rotatably openable and closable relative to the rear protective case 2, so that while the foldable phone is unfolded and folded, the stylus pen holder 3 can cover the hinge of the foldable phone, which can effectively protect the hinge of the foldable phone and prolong the service life of the foldable phone. A side wall of the front protective case 1 is not closed along a circumferential direction, and extends roughly in a U shape along the circumferential direction. The rear protective case 2 is configured to accommodate the lower folding portion of the foldable phone. The rear protective case 2 includes a bottom wall and a side wall. The side wall extends from a periphery of the bottom wall, and defines together with the bottom wall an accommodating cavity for accommodating the lower folding portion of the foldable phone. The side wall of the rear protective case 2 is not closed along the circumferential direction, and extends roughly in a U shape along the circumferential direction. The front protective case 1 and the rear protective case 2 form a rectangular frame structure after unfolded. The front protective case 1 is provided with a light transmission window or a hollow window 11. The first screen of the foldable phone can be seen through the hollow window 11 of the front protective case 1.

The stylus pen holder 3 has a roughly U-shaped cross section. The stylus pen holder 3 includes a first side surface 31 and a second side surface 32 parallel to each other. The front protective case 1 is detachably connected with the first side surface 31, and the rear protective case 2 is rotatably connected with the second side surface 32. There are smooth transitions at corners on an outer surface of the stylus pen holder 3. The stylus pen holder 3 may be coated with one or more layers of shock-proof material, or the stylus pen holder 3 may be integrally made of hard rubber and a shock-proof material to further increase the strength of the stylus pen holder 3.

Magnetic members capable of attracting each other are respectively embedded in the first side surface 31 of the stylus pen holder 3 and opposite side walls of the front protective case 1 in corresponding positions, thereby obtaining a magnetic connection between the stylus pen holder 3 and the front protective case 1.

As shown in FIG. 5 to FIG. 9, an accommodating cavity 33 suitable for accommodating a stylus pen 5 is provided in the stylus pen holder 3. The stylus pen 5 is arranged in a pen sleeve 4. The pen sleeve 4 is arranged in the accommodating cavity 33. In order to adapt to different sizes of stylus pens 5, the pen sleeve 4 is arranged. A large-sized stylus pen 5 can be directly inserted into the stylus pen holder 3. A small-sized stylus pen 5 can be inserted into the pen sleeve 4, and then the pen sleeve 4 is inserted into the stylus pen holder 3, so as to widen an application range of the stylus pen holder 3.

A top of the stylus pen holder 3 is provided with an insertion hole 34, and the insertion hole 34 communicates with the accommodating cavity 33. When in use, the stylus pen 5 is put into the pen sleeve 4 through the insertion hole 34. One side of the pen sleeve 4 is provided with a semicircular groove 41, and the stylus pen 5 is arranged in the semicircular groove 41. A first mounting cylinder 331 and a second mounting cylinder 332 are arranged in the accommodating cavity 33, and two opposite sides of the side wall of the accommodating cavity 33 are provided with elastic protrusions 35 for elastically clamping the pen sleeve 4 in the accommodating cavity 33.

An outer side of the second mounting cylinder 332 is provided with an avoidance hole 333. When it is required to take out the stylus pen, the stylus pen 5 may be pushed upward through the avoidance hole 333 from the outer side of the stylus pen holder 3, so that the stylus pen 5 can be taken out of the pen sleeve 4.

Figure 9A:
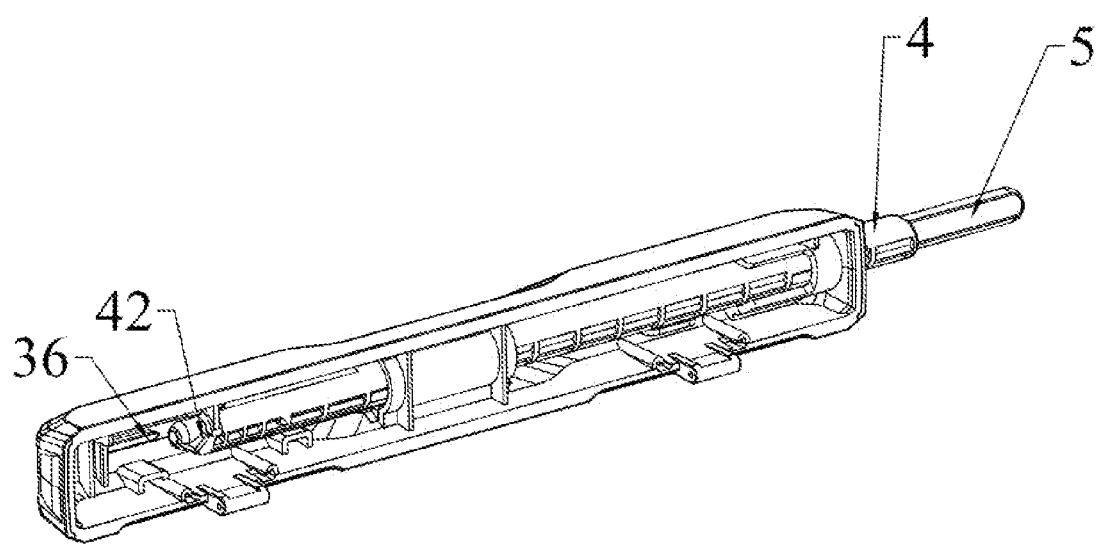
FIG. 9A is a schematic structural view of the pen sleeve in a non-aligned state.
Figure 9B:
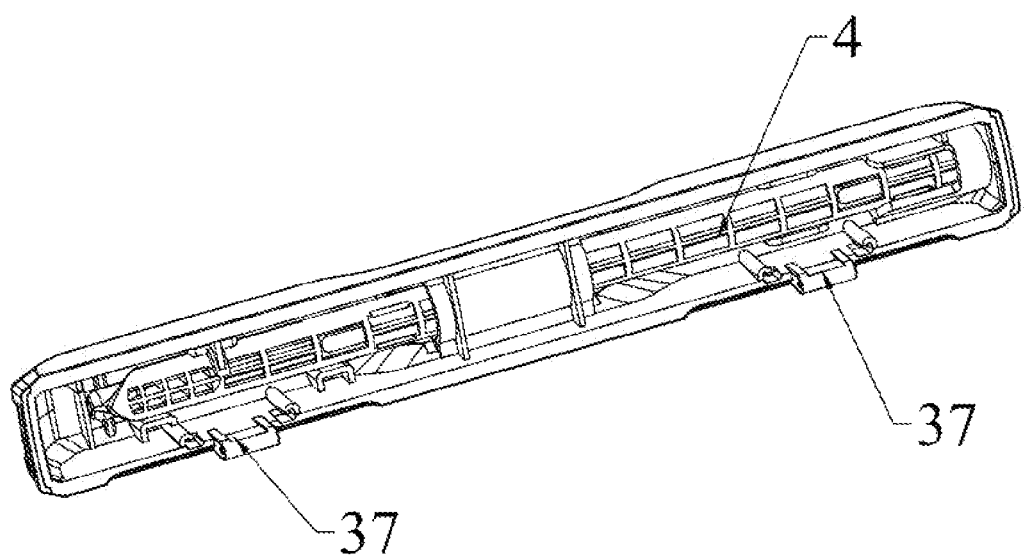
FIG. 9B is a schematic structural view of the pen sleeve in an aligned state after inserted into the stylus pen holder.

In order to make an open side of the semicircular groove 41 always aligned with the avoidance hole 333, a bottom end of the pen sleeve 4 is provided with an automatic alignment structure. The automatic alignment structure includes a guide groove 43 provided at a bottom of the pen sleeve 4, and the guide groove 43 extends respectively from two sides to the bottom end of the pen sleeve 4 to form arc surfaces 42. The arc surfaces 42 on the two sides intersect at the bottom end of the pen sleeve 4, and an opening formed by the arc surfaces 42 on the two sides gradually expand from top to bottom. A bottom end of the accommodating cavity 33 is provided with a guide strip 36, and the guide strip 36 is insertable into the guide groove 43 along the arc surfaces 42 on the two sides. In order to facilitate the insertion of the guide strip 36 into the guide groove 43, a front end of the guide strip 36 is pointed. As shown in FIG. 9(a), the pen sleeve 4 is inserted into the accommodating cavity 33 in any direction. The guide strip 36 comes into contact with the arc surfaces 42 first. As the further insertion of the pen sleeve 4, the guide strip 36 is in contact with the arc surfaces 42 all the time and finally inserted into the guide groove 43. During this process, the pen sleeve 4 rotates under the action of the guide strip 36. After the guide strip 36 is inserted into the guide groove 43, as shown in FIG. 9(b), the pen sleeve 4 is in an aligned position, that is, the open side of the semicircular groove 41 is aligned with the avoidance hole 333, so that the stylus pen 5 can be taken out conveniently.

The rear protective case 2 includes a button portion 21, a sound transmission hole 22, a data line jack 23, a camera hole 24, a hinge groove 25 and a bracket groove 26. One side of the rear protective case 2 adjacent to the second side surface 32 is provided with the hinge groove 25, and an edge on the other side the rear protective case 2 is provided with the button portion 21. A bottom of the rear protective case 2 is provided with the data line jack 23, and a rear surface of the rear protective case 2 is provided with a plurality of sound transmission holes 22 and a camera hole 24.

Figure 2:
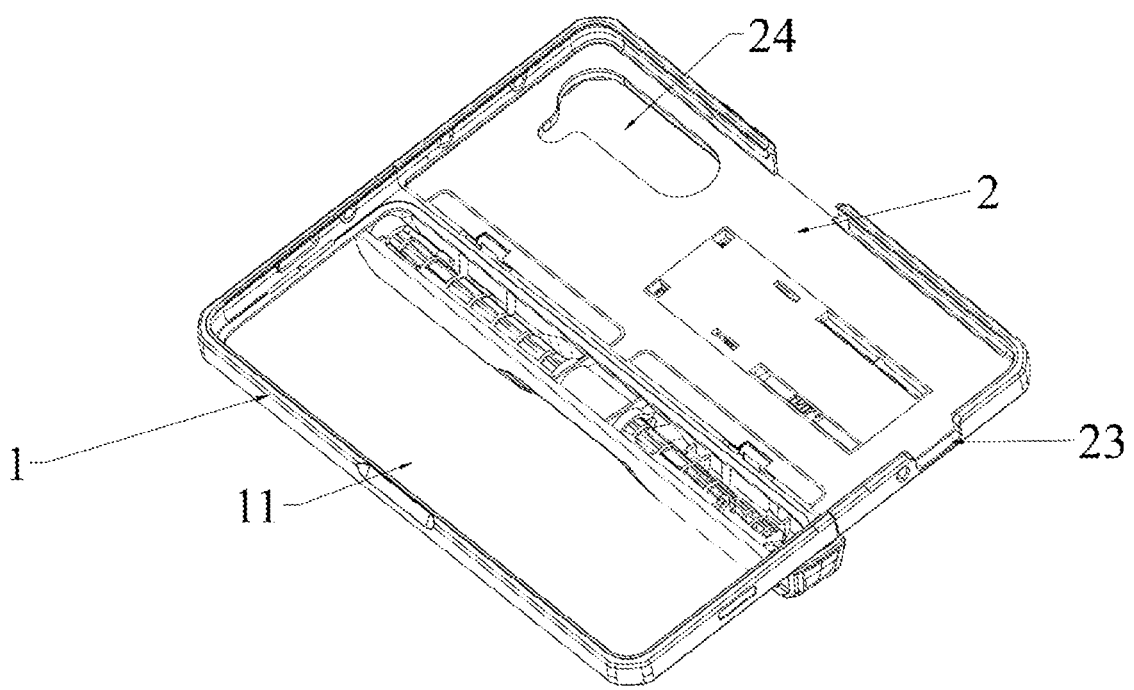
FIG. 2 is a schematic three-dimensional structural view of the foldable phone case, in which the front protective case and the rear protective case are completely unfolded.
Figure 3:
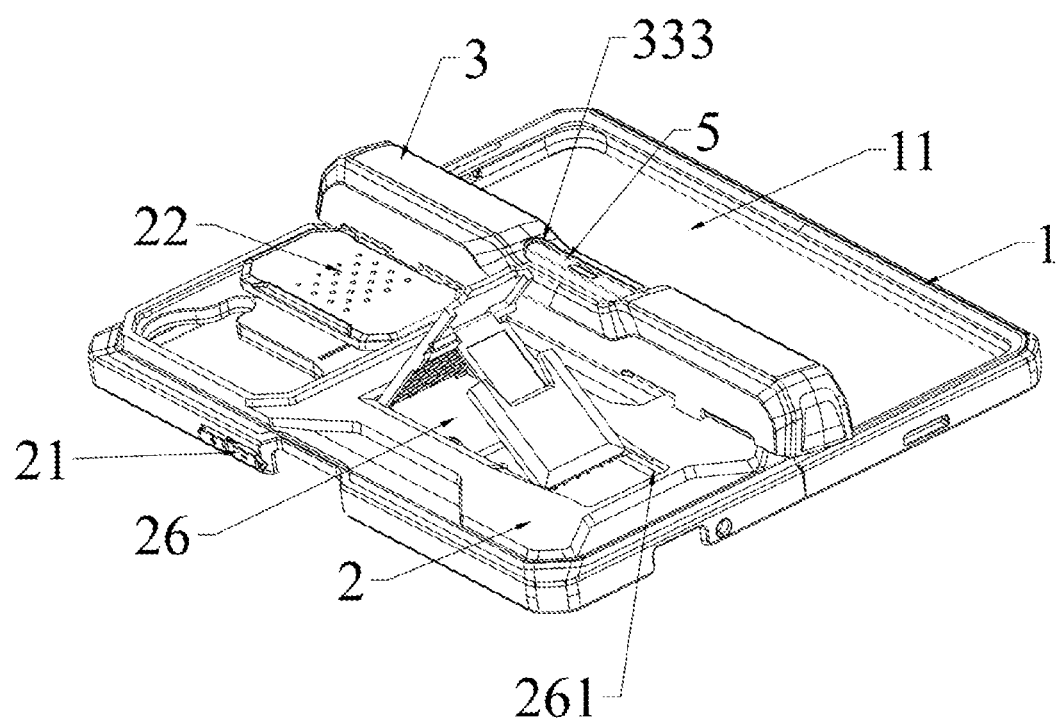
FIG. 3 is another schematic three-dimensional structural view of the foldable phone case, in which the front protective case and the rear protective case are completely unfolded.
Figure 4:
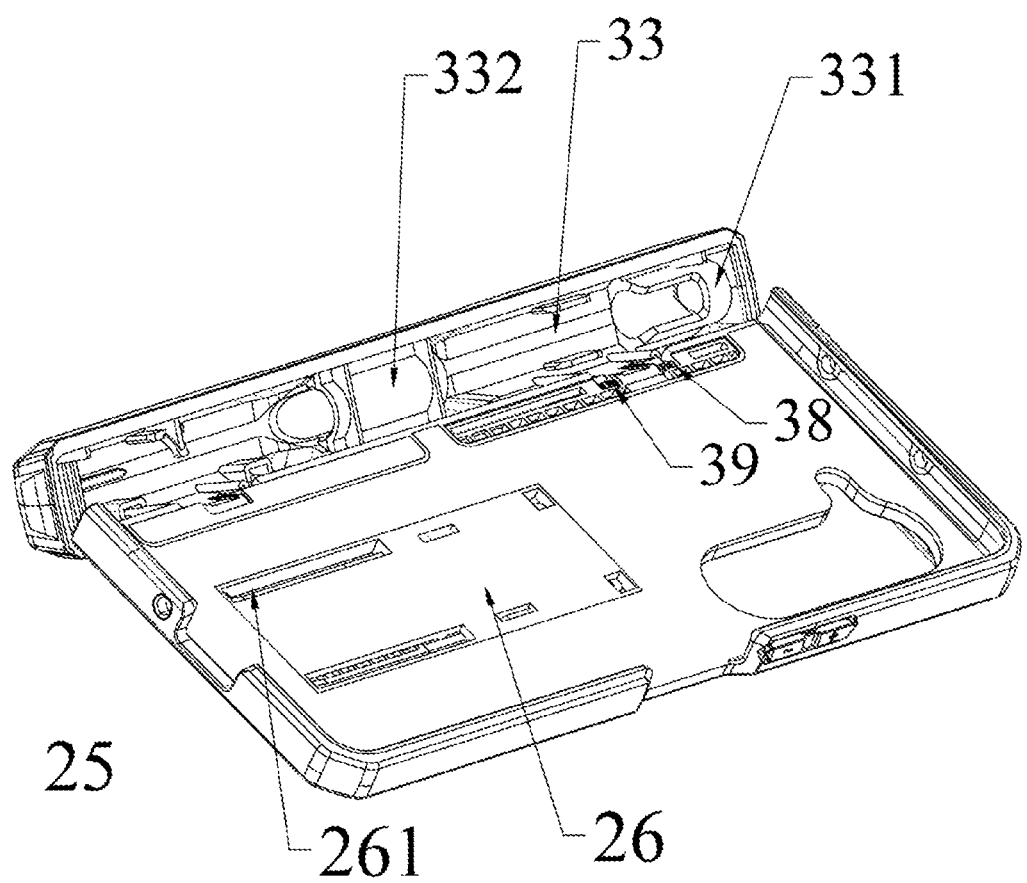
FIG. 4 is a schematic structural view of a stylus pen holder unfolded relative to the rear protective case.
Figure 5:
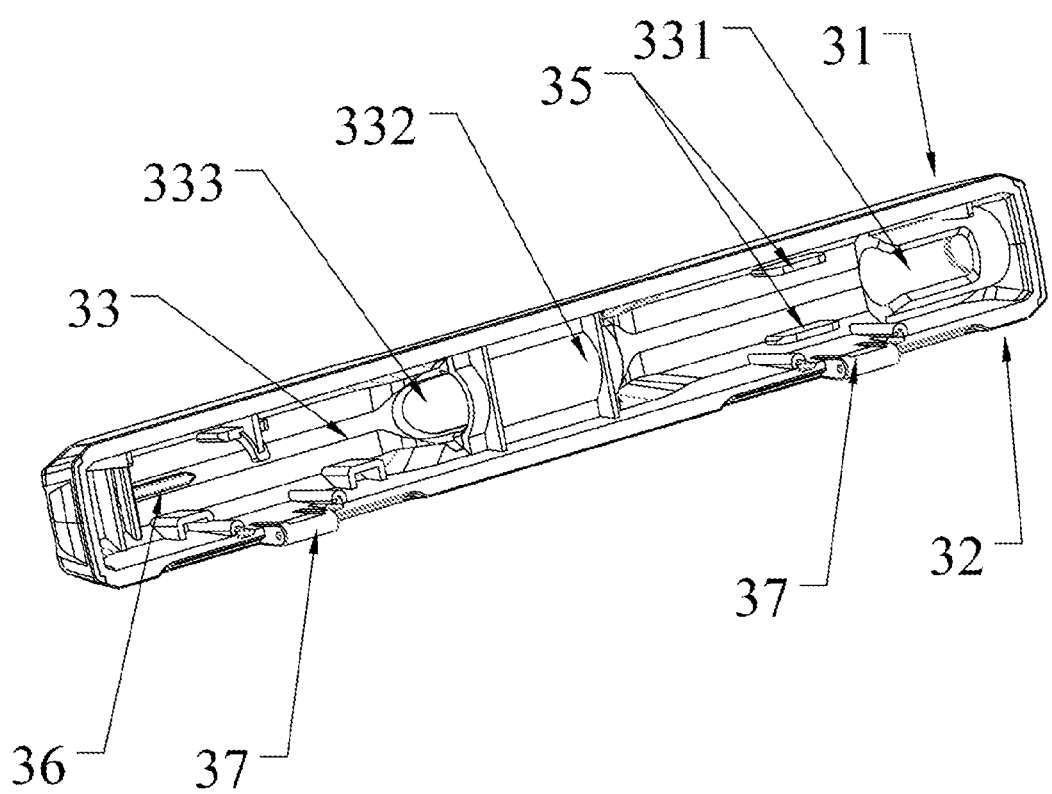
FIG. 5 is a schematic structural view of the stylus pen holder.
Figure 6:
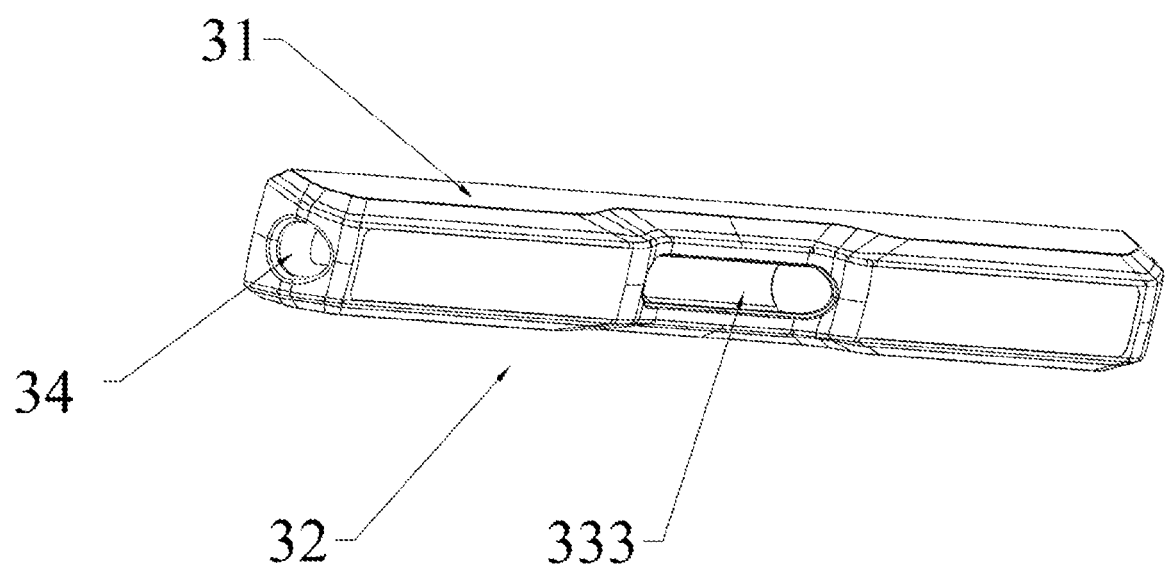
FIG. 6 is a schematic structural view of the stylus pen holder from another viewing angle.
Figure 7:
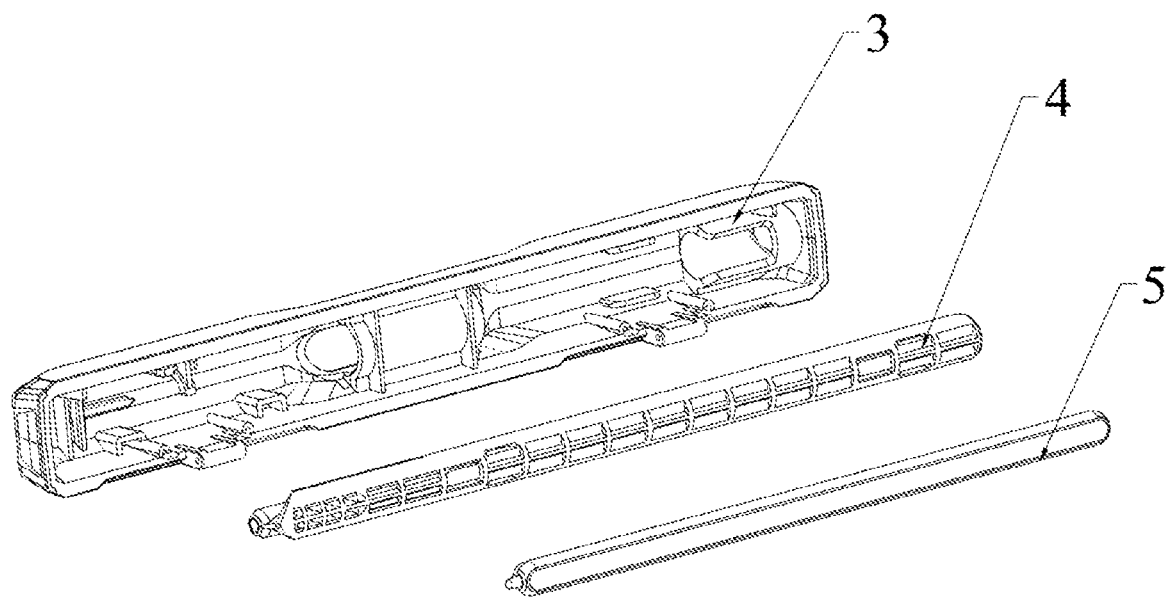
FIG. 7 is a schematic assembly diagram of the stylus pen holder.
Figure 8:
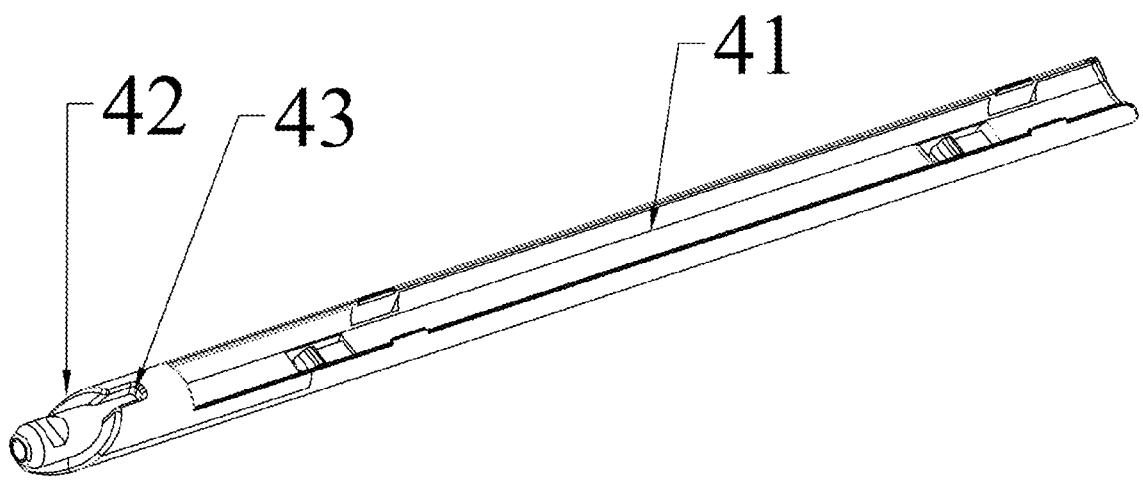
FIG. 8 is a schematic structural view of a pen sleeve.

The stylus pen holder 3 is rotatably connected with the rear protective case 2. The connecting structure includes a hinge protrusion 37 arranged on the second side surface 32 of the stylus pen holder 3. The hinge protrusion 37 is arranged in the hinge groove 25, and a pin 38 is arranged in the hinge protrusion 37 and the hinge groove 25. A torsion spring 39 is arranged in a gap between the hinge protrusion 37 and the hinge groove 25. One end of the torsion spring 39 is fixedly connected with the hinge groove 25, and the other end is fixedly connected with the hinge protrusion 37. The torsion spring 39 is sleeved on a periphery of the pin 38. As shown in FIG. 2 to FIG. 3, when the front protective case 1 and the rear protective case 2 are unfolded, the torsion spring 39 is compressed. When the front protective case 1 and the rear protective case 2 are folded, the elastic force of the torsion spring 39 is released, and the stylus pen holder 3 is restored under action of the elastic force, so that the stylus pen holder 3 is always in contact with the phone, thereby protecting the hinge of the phone in real time.

Figure 10:
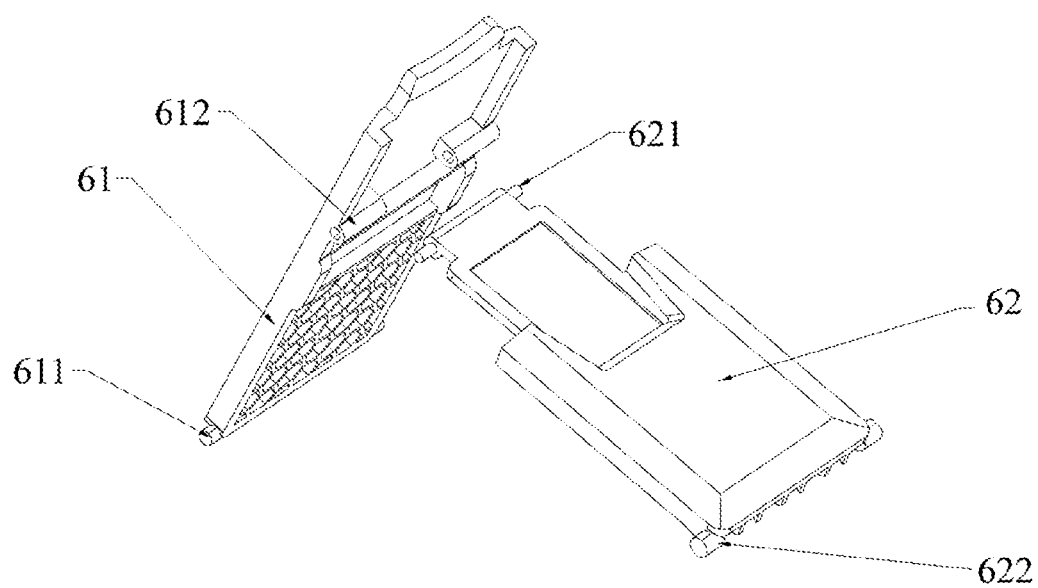
FIG. 10 is a schematic structural view of a bracket.
Figure 11:
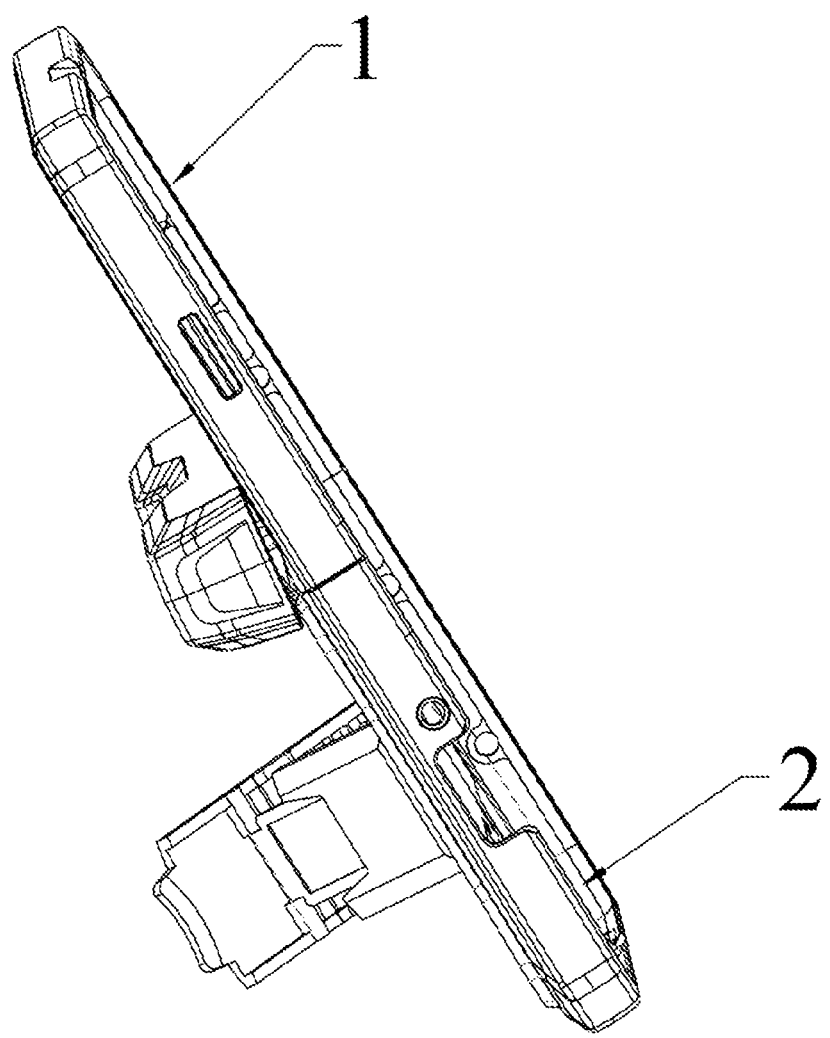
FIG. 11 is a schematic structural view of a bracket in use.
Figure 12:
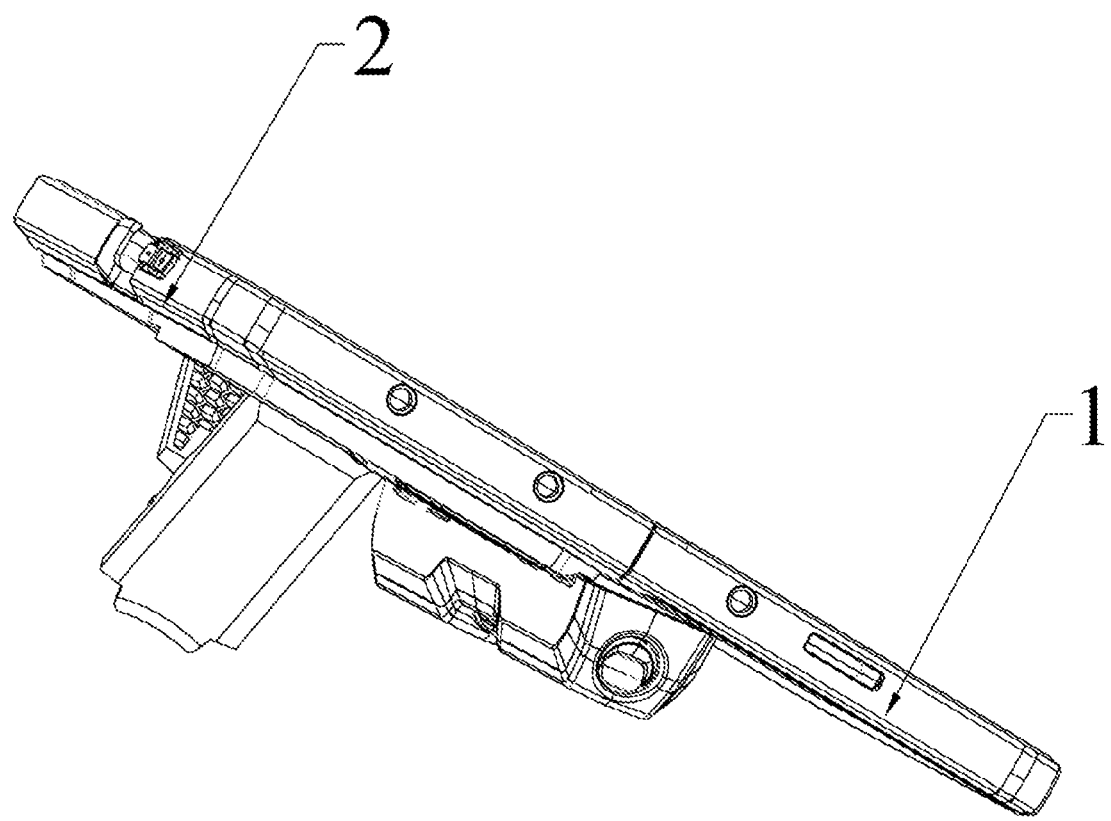
FIG. 12 is another schematic structural view of the bracket in use.

The rear surface of the rear protective case 2 is rotatably connected with a bracket 6, and the bracket 6 is openable or closable relative to the rear protective case 2. The rear surface of the rear protective case 2 is further provided with a bracket groove 26, and two sides of the lower part of the bracket groove 26 are provided with sliding grooves 261. The bracket 6 is accommodatable in the bracket groove 26 when closed, and a length direction of the bracket groove 26 is parallel to a length direction of the rear protective case 2. As shown in FIG. 10, the bracket 6 is a foldable structure, including a rotating bracket 61 and a sliding bracket 62. The rotating bracket 61 is rotatably connected with the sliding bracket 62. One end of the rotating bracket 61 is provided with a first hinge pin 611, and a middle part of the rotating bracket is provided with a first hinge hole 612. One end of the sliding bracket 62 is provided with a second hinge pin 621, and the other end is provided with a third sliding pin 622. The first hinge pin 611 is inserted into the upper part of the bracket groove 26, so that the rotating bracket 61 is rotatably connected with the upper part of the bracket groove 26. The third sliding pin 622 is inserted into the sliding groove 261 and slidably connected with the sliding groove 261, so that the sliding bracket 62 is slidably connected with the lower part of the bracket groove 26. The first hinge hole 612 is rotatably connected with the second hinge pin 621, so that the rotating bracket 61 is rotatably connected with the sliding bracket 62.

As shown in FIG. 3 and FIG. 10 to FIG. 12, when the user needs the bracket to work, the rotating bracket 61 is pulled up, so that the third sliding pin 622 at the bottom of the sliding bracket 62 slides in the sliding groove 261, and the rotating bracket 61 and the sliding bracket 62 form a triangular support frame structure. When the phone is unfolded, the rear protective case 2 may serve as a supporting surface, or the front protective case 1 may serve as a supporting surface, so as to realize different use angles. When the user does not need the bracket, the rotating bracket 61 is pressed by a hand, so that the rotating bracket 61 rotates toward the bracket groove 26, and finally, the rotating bracket 61 and the sliding bracket 62 are received in the bracket groove 26.

It should be noted that relational terms such as "first" and "second" herein are only used to distinguish one entity or operation from another entity or operation, and do not necessarily require or imply any such actual relationship or sequence between these entities or operations. The content not described in detail in this specification belongs to the prior art known to those skilled in the art.

Based on the above, the above are only preferred examples of the present disclosure, and are not intended to limit the present disclosure in any form. Any person of ordinary skill in the art can smoothly implement the present disclosure as shown in the accompanying drawings and described above. However, any equivalent changes such as variations, modifications and evolutions made based on the technical contents disclosed above by those skilled in the art without departing from the scope of the technical solutions of the present disclosure are equivalent examples of the present disclosure. Moreover, any equivalent changes such as variations, modifications and evolutions made to the above examples according to the essential technology of the present disclosure still fall within the protection scope of the technical solutions of the present disclosure.

What is claimed is:

1. A foldable phone case, a foldable phone comprising an upper folding portion with a first screen and a lower folding portion with a second screen, and the upper folding portion and the lower folding portion being connected through a hinge, wherein the foldable phone case comprises:
    a front protective case, configured to accommodate the upper folding portion of the foldable phone; a rear protective case, configured to accommodate the lower folding portion of the foldable phone; and
    a stylus pen holder, comprising a first side surface and a second side surface parallel to each other, the front protective case being detachably connected with the first side surface, the rear protective case being rotatably connected with the second side surface, and the stylus pen holder being rotatably openable and closable relative to the rear protective case; wherein
    an accommodating cavity suitable for accommodating a stylus pen is provided in the stylus pen holder, the stylus pen is arranged in a pen sleeve, the pen sleeve is arranged in the accommodating cavity, a bottom end of the pen sleeve is provided with an automatic alignment structure, a top of the stylus pen holder is provided with an insertion hole, and the insertion hole communicates with the accommodating cavity.

2. The foldable phone case according to claim 1, wherein the automatic alignment structure comprises a guide groove provided at a bottom of the pen sleeve, and the guide groove extends respectively from two sides to the bottom end of the pen sleeve to form arc surfaces, the arc surfaces on the two sides intersecting at the bottom end of the pen sleeve, and an opening formed by the arc surfaces on the two sides gradually expanding from top to bottom; a bottom end of the accommodating cavity is provided with a guide strip, and the guide strip is insertable into the guide groove along the arc surfaces on the two sides.

3. The foldable phone case according to claim 2, wherein a first mounting cylinder and a second mounting cylinder are arranged in the accommodating cavity, an outer side of the second mounting cylinder being provided with an avoidance hole, and a side wall of the accommodating cavity being provided with elastic protrusions.

4. The foldable phone case according to claim 1, wherein one side of the rear protective case adjacent to the second side surface is provided with a hinge groove, and the second side surface of the stylus pen holder is provided with a hinge protrusion; the hinge protrusion is arranged in the hinge groove, and a pin is arranged in the hinge protrusion and the hinge groove; a torsion spring is arranged in a gap between the hinge protrusion and the hinge groove, one end of the torsion spring being fixedly connected with the hinge groove, and the other end being fixedly connected with the hinge protrusion; and the torsion spring is sleeved on a periphery of the pin.

5. The foldable phone case according to claim 4, wherein a side edge of the rear protective case is provided with a button portion, a bottom of the rear protective case is provided with a data line jack, and a rear surface of the rear protective case is provided with a sound transmission hole and a camera hole; and there are a plurality of sound transmission holes provided.

6. The foldable phone case according to claim 1, wherein a rear surface of the rear protective case is rotatably connected with a bracket, and the bracket is openable or closable relative to the rear protective case.

7. The foldable phone case according to claim 6, wherein the rear surface of the rear protective case is further provided with a bracket groove, the bracket is accommodatable in the bracket groove when closed, and a length direction of the bracket groove is parallel to a length direction of the rear protective case.

8. The foldable phone case according to claim 7, wherein the bracket comprises a rotating bracket and a sliding bracket, the rotating bracket being rotatably connected with the sliding bracket; and the rotating bracket is rotatably connected with an upper part of the bracket groove, and the sliding bracket is slidably connected with a lower part of the bracket groove.

9. The foldable phone case according to claim 8, wherein two sides of the lower part of the bracket groove are provided with sliding grooves;

one end of the rotating bracket is provided with a first hinge pin, and a middle part of the rotating bracket is provided with a first hinge hole; one end of the sliding bracket is provided with a second hinge pin, and the other end is provided with a third sliding pin;

the first hinge pin is inserted into the upper part of the bracket groove and rotatably connected with the bracket groove; the first hinge hole is rotatably connected with the second hinge pin; and the third sliding pin is inserted into the sliding groove and slidably connected with the sliding groove.

10. The foldable phone case according to claim 2, wherein one side of the pen sleeve is provided with a semicircular groove, and the stylus pen is arranged in the semicircular groove.

11. The foldable phone case according to claim 3, wherein two opposite sides of the side wall of the accommodating cavity are provided with the elastic protrusions for elastically clamping the pen sleeve in the accommodating cavity.

12. The foldable phone case according to claim 1, wherein magnetic members capable of attracting each other are respectively embedded in the second side surface of the stylus pen holder and opposite side walls of the front protective case in corresponding positions.

* * * * *